(No Model.)

G. H. BRINSER.
THILL COUPLING.

No. 596,474.  Patented Jan. 4, 1898.

Witnesses:
Paul A. Hett
C. Emlen Urban

Inventor:
George H. Brinser.
By
Daniel H. Herr,
Attorney.

UNITED STATES PATENT OFFICE.

GEORGE H. BRINSER, OF LANCASTER, PENNSYLVANIA.

THILL-COUPLING.

SPECIFICATION forming part of Letters Patent No. 596,474, dated January 4, 1898.

Application filed May 13, 1897. Serial No. 636,273. (No model.)

*To all whom it may concern:*

Be it known that I, GEORGE H. BRINSER, a citizen of the United States, residing at Lancaster, in the county of Lancaster and State of Pennsylvania, have invented certain new and useful Improvements in Quick-Action Thill-Couplings; and I do hereby declare the following to be a full, clear, and exact description of the invention, such as will enable others skilled in the art to which it appertains to make and use the same.

This invention relates to improvements in a thill-coupling of that class in which a revoluble disk is so arranged and operated within a recess in a projection from a clip side as to convey the bolt of a thill-iron to the abutting or securing point, automatically locking it in place in coupling and again away therefrom in uncoupling.

The object of the invention is to provide a simple and effective coupling whereby shafts or poles may be conveniently and expeditiously attached to or removed from the forward ends of vehicles without screwing or unscrewing either nuts or bolts or turning levers, to automatically lock said shafts or poles securely in place when attached, and to provide means through the locking device to make said coupling antirattling.

The elements of the invention will severally and at large appear in the following description, and they will be separately and collectively set forth in the claim.

The purposes of the invention are attained by the mechanisms and devices illustrated in the accompanying drawings, in which similar letters of reference designate like parts throughout the several views, and in which—

Figure 1:
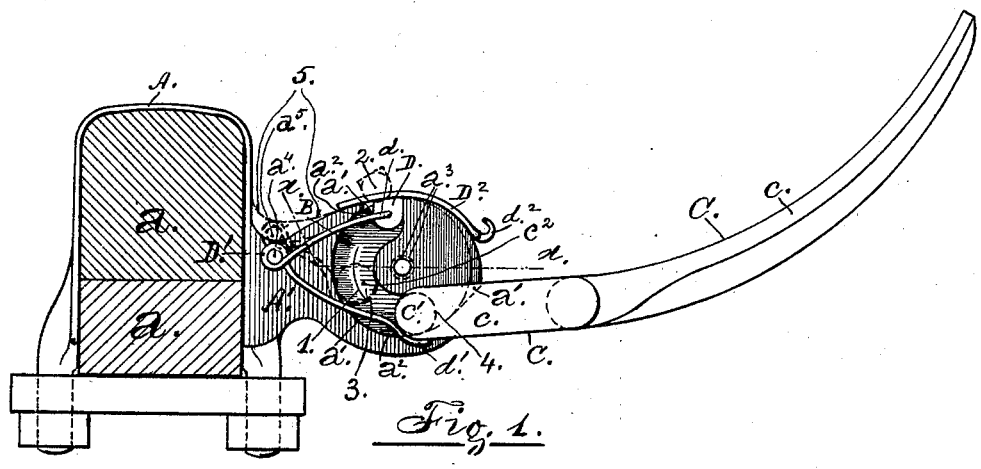
Figure 2:
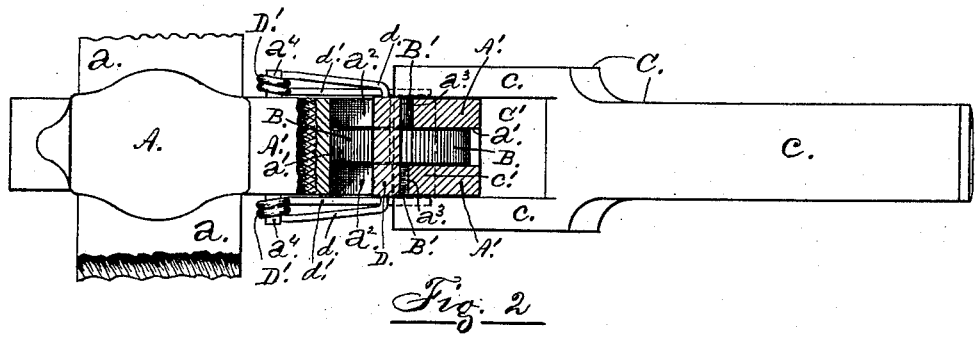
Figure 3:
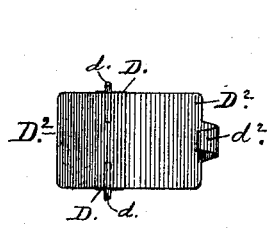
Figure 4:
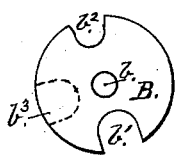
Figure 5:
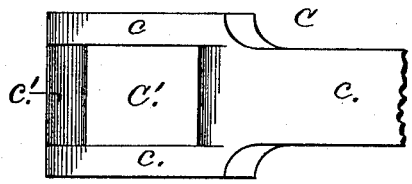

Figure 1 is a full side elevation of a thill-coupling embodying the elements of the invention; Fig. 2, a direct plan of the same with the portion of the clip projection above the line $x\ x$ in Fig. 1 and the covering-plate removed, showing the revoluble disk in the recess and the locking-bolt with attached spring ends in place; and Figs. 3, 4, and 5 are views showing details of the covering-plate, the revoluble disk with the headless bolt, and the thill-iron detached from their respective positions.

From the forward side of an ordinary clip A, attached to an axle $a$ in the usual way, projects a lug A′, having a recess $a'$ opening diagonally through the top and front ends thereof for the housing of the revoluble disk, to be hereinafter described. In the sides of the lug, opening through their top edges, conforming to the periphery of said disk and extending downwardly to any approved points 4 forward of the vertical plane of the pivot-center, are circularly-curved recesses $a^2\ a^2$ for the passage of the thill-iron coupling-bolt, yet to be described, to the lower or forward ends of said recesses $a^2$, constituting the abutting or resting points of said bolt when coupling is completed. Through these sides, in the axial center line of the recess $a'$, are formed orifices $a^3\ a^3$, one of them screw-threaded, to receive and hold a headless screw or bolt, yet to be described, on which said disk is journaled to perform its functions. At prescribed points near their tops and rearward ends these sides are provided with lugs or pins $a^4\ a^4$ to engage the eyes of two-armed springs, yet to be described, securely holding said springs in place. This lug A′, with the elements described, constitutes the supporting body or base of the invention.

Into the recess $a'$ of the lug above mentioned is fitted a circular disk B, of dimensions to fill the circular portion of said recess, and having at its center an axial bore $b$ for journaling or pivoting on the headless bolt before mentioned. At prescribed points in the periphery of the disk are formed crosswise U-shaped recesses $b'\ b^2$. The first, $b'$, having a depth and width equal to the width of the circular recesses $a^2$ before mentioned, with which it registers, is adapted to receive the coupling-bolt of the thill-iron before mentioned, carrying it to the abutting-points in coupling and again therefrom in uncoupling, while the second, $b^2$, is adapted to receive and hold a disk-locking bolt, yet to be described, when coupling is completed; but these recesses $b'\ b^2$ must be such a distance apart that when the former, $b'$, shall be at the abutting-point of the recesses $a^2$ the latter, $b^2$, will be at their entrance. A headless screw or bolt B′, having a threaded end fitting the threaded orifice $a^3$ before mentioned, being passed through the orifices $a^3$ and through the axial bore $b$, the disk B being in position within the recess $a$, serves to journal said disk revolubly in place.

In the drawings, C designates the thill-iron, with the usual end $c$ for attaching to the thills of vehicles or to the yoke ends of their poles in the usual manner. The thill-iron has at its rearward or coupling end a loop or link C', comprising the side bars $c\,c$ and the rear end bar $c'$, all arranged and integrally joined, as shown, and having sufficient space in the opening thereof to pass over the lug A' into the position shown in Figs. 1 and 2.

The bar $c'$ constitutes the coupling-bolt of the invention and is adapted to be placed into the recess $b'$ of the disk B when said recess is at the top or opening into the curved recesses $a^2$ and carried thereby on turning or rotating said disk in the direction of the arrow 1 through said recesses $a^2$ to the abutting-point, when the recess $b^2$ of the disk will be at or in said openings. Now to lock or hold the disk B in said position or the bolt $c'$ securely at the abutting-point a practically U-shaped bar or bolt D is fitted into the recess $b^2$ of the disk, with the ends of the bolt extending through the recesses $a^2$, as shown, having inserted and rigidly secured into its extremities the outer ends of the upper arms $d$ of two-armed springs D', having their eyes formed by a number of coils on the lugs $a^4$, as shown, and the outer ends of their lower arms $d'$ underneath and partially against the rearward ends of the side bars $c$, as shown. The tension of these springs through their arms securely holds the bolt within the recess $b^2$, preventing the rotating or revolving of the disk, thus firmly securing the coupling-bolt $c'$ in place, and the resiliency of the arms allows the bolt D to be raised to the dotted position 2, (shown in Fig. 1,) when said disk may be rotated or revolved in the direction opposite to that of the arrow 1, carrying the bolt $c'$ with it in its course to the openings, from which it may be lifted in uncoupling, a backward push on the thill-iron effecting said rotation, while the upper and partially forward pressure of the ends of the arms $d'$ against the ends of the side bars $c$, as shown, checks motion of the bolt $c'$ at this point, making the coupling to be practically anti-rattling. The top of the bolt or bar D being practically flat has rigidly secured thereto, as by soldering, a plate $D^2$, extending over the top of the lug, as shown, constituting a covering to the recesses therein, guarding against the ingress of dirt, and at the forward end of the plate is a turned-up loop or fold $d^2$, making a handle, whereby the bolt D may be lifted when uncoupling is desired.

The curved recesses $a^2$ may be made to terminate in the dotted curve 3. Locating the abutting or bolt-coupling point immediately below the horizontal plane passing through the disk pivot-center and changing the bolt-recess $b'$ of the disk to the dotted position $b^3$ in Fig. 4, said bolt $c'$ will assume the dotted position $c^2$ in Fig. 1 and have a better support, its ends engaging forwardly and rearwardly the edges of the recess sides. In its rearward end the lug A' may be thickened upwardly, as indicated by the dotted line 5, and the spring securing-pins may be changed to the dotted positions $a^5$, with the eyes of the springs engaging them and their arms conforming to the new conditions, also as indicated by dotted lines, without changing the character of the invention. It will be noted in this modification, with the bar D lifted from the disk-recess $b^2$, as shown, the lower spring-arm will aid the uncoupling by acting upwardly against the under side of the bolt.

The invention having been thus described and the manner in which its functions are performed fully set forth, what I do consider new, and desire to secure by Letters Patent, is—

A thill-coupling comprising a lug projecting from a side of a clip and having a circular-disk-housing recess within its body and curved recesses in the sides opening through their tops and downwardly along the rearward edge of said disk-recess with bolt-coupling rests or bearings at their lower ends, a circular disk revolubly and centrally journaled in said disk-recess and having a coupling-bolt recess in the peripheral edge thereof to register with the lower ends of said side recesses with a locking-bolt recess in the same edge to register with their upper end openings, a coupling-bolt at the rear end of a thill-iron in said bolt-recess and a disk-locking bolt in said locking-bolt recess with its ends engaging said side recesses, two-armed springs having the juncture of their arms secured in position against the outer faces of the lug and the extremities of their upper arms secured into the outer ends of said locking-bolt with the extremities of their lower arms bearing against the under and rearward sides of the ends of the coupling-bolt as shown, and a covering-plate secured to the top of the disk-locking bolt, all substantially as described and for the purpose hereinbefore set forth.

In testimony whereof I affix my signature in presence of two witnesses.

GEO. H. BRINSER.

Witnesses:
 HARVEY B. LUTZ,
 DANIEL H. HERR.